W. H. Ward,
Mill Gearing.
No. 108,539.  Patented Oct. 18, 1870.
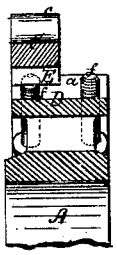
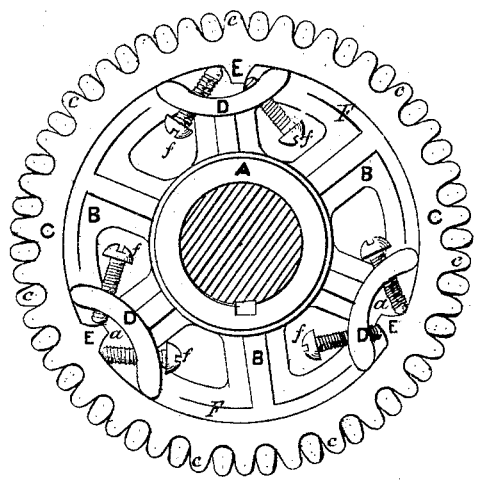
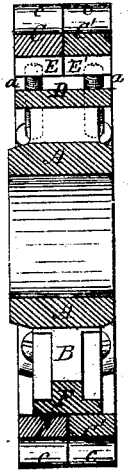
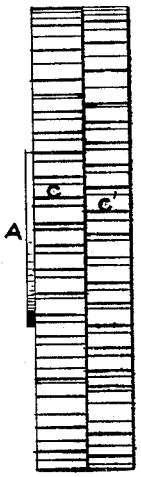
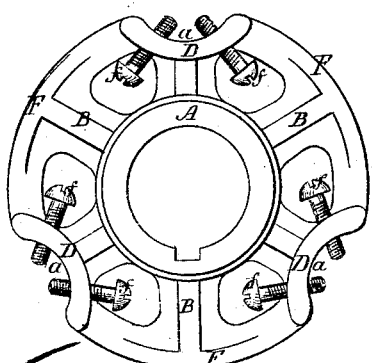
WITNESS
INVENTOR W. H. Ward

United States Patent Office.

WILLIAM H. WARD, OF AUBURN, NEW YORK.

Letters Patent No. 108,539, dated October 18, 1870.

IMPROVEMENT IN ADJUSTABLE GEAR-WHEELS.

The Schedule referred to in these Letters Patent and making part of the same.

*To all whom it may concern:*

Be it known that I, WILLIAM H. WARD, of Auburn, in the county of Cayuga and State of New York, have invented certain new and useful Improvements in the Construction of Gear-Wheels for Preventing Back-Lash; and I do hereby declare that the following is a full, clear, and exact description thereof, reference being had to the accompanying drawing which makes part of this specification, and in which—

Figure 1 represents an elevation of a double-rimmed toothed or gear-wheel, embracing my improvements, the teeth of one rim occupying the spaces of the other, for the purpose of exposing only the double adjustable rims.

Figure 2 represents an elevation of the toothed double rims.

Figure 3 represents a diametrical section of the wheel.

Figure 4 represents an elevation of the central or fixed part of the wheel.

Figure 5 represents a sectional view of a portion of the wheel, showing one of the adjustable toothed rims removed from its seat.

Figure 6 represents an elevation of the same.

To produce a cog-wheel that will not only admit of adjustment to compensate for the wear of the teeth, but will also prevent back-lash, is the object of my improvement, which consists in constructing a single wheel with two separate and distinct toothed rims, secured adjacent to each other upon the same fixed seat, to be adjusted thereon in such manner that, while one of the rims will compensate for any wear in the teeth, the other, by a counter adjustment, will take up the back-lash of the gearing, however great, without the aid of a fixed toothed rim or wheel upon the same fixed seat.

In the accompanying drawing—

A represents the hub, B the arms, and C C' the toothed or cogged rims of the wheel.

The hub and arms are not, as heretofore, cast with the toothed rim of the wheel, but are separate and distinct from it, and made with a rim, F, that encircles the extremity of the arms, and constitutes a seat for the outer toothed rims.

The circumference of this seat is interrupted, so as to form recesses, *a*, therein.

The part of the seat thus recessed is of a width equal to that of the rims, as shown in figs. 3, 5, and 6, so as to form sides, D, to the recesses, to receive screw-bolts, *f*, or their equivalents, through each side of said recessed portion of the rim, so that their points of bearing will approach each other. The part thus constructed constitutes the fixed member of the wheel, and is secured or keyed, in the usual manner, to the revolving shaft.

The cogged or toothed rims C C' constitute the adjustable members of the wheel, and their inner concentric surface is of a diameter sufficient to allow them to be properly fitted upon the web or seat F of the fixed part of the wheel, as shown in fig. 1.

The outer sides of these rims are constructed with cogs, or teeth, *c*, in the usual manner, while their inner sides have projections, E, of such form and size as to extend into each recess, and between the converging points of the screws, in such manner that the latter will bear against the opposite sides of the projections E, and have sufficient space between their bearing points and the sides of the recesses in the seat for the proper adjustment of the cogged rims.

The cogged or toothed rims are fitted exactly alike upon their fixed seat, adjacent to each other, so that they may be adjusted separately thereon. In this particular, therefore, they not only differ from a toothed gear-wheel having a single rim adjustable, but from a split or double gear-wheel having a fixed and a movable toothed rim, as well as from a gear-wheel composed of three parts, viz., having an adjustable toothed wheel on either side of a fixed one, because the fixed concentric seat, in my improved wheel, renders a fixed toothed rim unnecessary. The teeth of the rims may be of different lengths of face, where one rim is used as a driver and the other to prevent back-lash.

The two adjustable rims, therefore, serve the purpose of a fixed and an adjustable toothed rim on the same wheel, and may be adjusted to bring their teeth out of coincidence, to compensate for the wear of the working-sides of the teeth, while at the same time, either of the said rims may be adjusted to take up any back-lash or lost motion of the gearing, because the adjustment of one of the toothed rims in one direction will compensate for the looseness caused by wear between the sides of the teeth, while a counter adjustment of the other section of the toothed rim will take up any lost motion throughout the gearing.

The adjustable toothed rims C C' and the interior fixed part of the wheel are held together by the binding hold or grip of the adjusting-screws *f*, which pass through the recessed portions D of the fixed seat F, and bear upon and against the opposite sides of the projections E of the adjustable arms C C', so as to bite and clamp the said projections between them, while the angles of the set-screws *f*, with reference to the axis of the wheel, are such that one will bear hard obliquely against one side of the projections, and the other will bear with like force from an oppositely-oblique direction, against the other side of the said projections E, and thus the parts are locked as firmly together as though they were made in one and the same wheel.

Each section of the rim is provided with like projections E, and, as each section is independent of the other, the set-screws are, therefore, arranged on each side of the fixed part of the wheel, so as to act upon the rims separately.

While the screws thus lock the parts of the wheel together, they also constitute the means for adjusting the toothed rims upon the seat F of the fixed part, the one to the right and the other to the left; this is done by unscrewing, and thus slackening the set-screws in the direction required, and tightening or screwing up those on the opposite side of the projections, and, as the part to which the said set-screws are secured is fixed upon the shaft, it will be seen that the toothed rims must move either to the right or left upon their fixed seat, and thus effect the required adjustment.

A wheel thus constructed may be fitted and work into intermediate gear-wheels of the ordinary construction, and, when adjusted, cause rotary dies for rolling axles, &c., or cylinders for printing calicoes, wall-paper, &c., to revolve in perfect register, so that, whenever motion is imparted to one shaft or wheel, the adjacent wheels into which it matches must respond to it with rigid firmness and exactness, a desideratum which it is utterly impossible to accomplish in producing such articles without the use of such an invention, because the slightest starting and stopping of the driving-wheel when any looseness exists in the teeth of the gear-wheel, will instantly impart an irregular motion to the dies, and cause the whole to rotate out of order; but with this improvement all must move in exact unison, and without any looseness or jerking motion whatever, if properly adjusted.

Back-lash in gearing cannot be effectually prevented by what is known as the split or double gear-wheel having a fixed and an adjustable toothed rim; nor by the arrangement of two adjustable wheels on either side of a fixed wheel, because the fixed rim, while it serves its purpose in connection with an adjustable rim or rims, to compensate for the wear of the teeth of each pair of wheels, by diminishing the spaces between their teeth, cannot admit of such an adjustment as will take up looseness running through a series of gear-wheels, as the fixed part acts as a bar to such adjustment by forming a lock to the teeth; but by my improvements of a divided adjustable toothed rim, without the intervention of a fixed toothed rim, this is fully accomplished, and the wheel rendered more simple and effective, and cheaper in construction, as the teeth of the two rims, side by side, may be adjusted to match with the teeth of the wheel which they drive until they are almost worn out.

Moreover, a very great advantage is obtained in the use of these two adjustable toothed rims upon the same seat, in lessening the width of the toothed surface of the wheel, and, consequently, the width of the wheels matching therein, and affords great facility for removal and replacement in case the teeth of one of the rims should, from any cause, be broken.

Having thus described my invention,

I claim—

The separate toothed rims, secured upon the same fixed seat, adjacent to each other, so that they may be adjusted to compensate for the wear of the teeth, and to prevent back-lash, without the aid of a fixed toothed rim or wheel upon the same seat, substantially as described.

W. H. WARD.

Witnesses:
   J. N. STARIN,
   T. H. S. TOWNE.